United States Patent [19]

Tanabe et al.

[11] Patent Number: 5,418,309
[45] Date of Patent: May 23, 1995

[54] POWDER COATING COMPOSITION

[75] Inventors: Hisaki Tanabe, Yawata; Yasuhiko Nakae, Sakai; Yoshio Eguchi, Ikeda, all of Japan

[73] Assignee: Nippon Paint Co., Ltd., Osaka, Japan

[21] Appl. No.: 174,168

[22] Filed: Dec. 29, 1993

Related U.S. Application Data

[63] Continuation of Ser. No. 748,556, Aug. 22, 1991, abandoned.

[30] Foreign Application Priority Data

Aug. 22, 1990 [JP] Japan ................... 2-221647

[51] Int. Cl.6 ........... C08G 18/80; C08G 18/42; C08G 63/127; C08G 63/181
[52] U.S. Cl. ................... 528/45; 524/904; 528/53; 528/54; 528/58; 528/80; 528/274; 528/283; 528/287; 528/304; 528/305; 528/308
[58] Field of Search ............ 524/904; 528/45, 53, 528/54, 58, 80, 274, 283, 297, 304, 305, 308

[56] References Cited

U.S. PATENT DOCUMENTS

| | | | |
|---|---|---|---|
| 3,053,810 | 9/1962 | Griehl et al. | 528/283 |
| 3,345,339 | 10/1967 | Parker et al. | 528/283 |
| 3,355,434 | 11/1967 | Milligan et al. | 528/297 |
| 3,953,403 | 4/1976 | Fujiyoshi et al. | 528/274 |
| 4,012,363 | 3/1977 | Brüning et al. | 528/308 |
| 4,065,438 | 12/1977 | Verborgt | 528/297 |
| 4,113,702 | 9/1978 | Psencik | 528/80 |
| 4,113,898 | 9/1978 | Gardziella et al. | 528/304 |
| 4,130,601 | 12/1978 | Ohoka et al. | 528/308 |
| 4,197,353 | 4/1980 | Tobias et al. | 528/305 |
| 4,223,097 | 9/1980 | Johannes et al. | 523/440 |
| 4,288,569 | 9/1981 | Rottmaier et al. | 525/113 |
| 4,338,431 | 7/1982 | Konig et al. | 528/274 |
| 4,463,140 | 7/1984 | Belder et al. | 528/297 |
| 4,471,108 | 9/1984 | Belder et al. | 528/308 |
| 4,528,355 | 7/1985 | Gras et al. | 528/45 |
| 4,920,008 | 4/1990 | Barbee | 525/124 |
| 4,957,814 | 9/1990 | Barbee et al. | 528/45 |
| 4,973,646 | 11/1990 | Witzeman et al. | 528/80 |
| 4,988,793 | 1/1991 | Barbee et al. | 528/283 |
| 5,006,612 | 4/1991 | Danick et al. | 528/297 |
| 5,028,682 | 7/1991 | Witzeman et al. | 528/45 |

FOREIGN PATENT DOCUMENTS

| | | |
|---|---|---|
| 0107888A1 | 5/1984 | European Pat. Off. |
| 0110450A | 6/1984 | European Pat. Off. |
| 0110451A | 6/1984 | European Pat. Off. |
| 0383601A | 8/1990 | European Pat. Off. |

*Primary Examiner*—Peter A. Szekely
*Attorney, Agent, or Firm*—Wenderoth, Lind & Ponack

[57] ABSTRACT

The present invention provides a powder coating composition which is suitable for precoated steel plates. The powder coating composition has excellent storage stability (e.g. blocking resistance) and provides a cured film having good weather resistance and a good balance of hardness and processability. The powder coating composition comprises;

(I) 95 to 70% by weight of a polyester resin having a glass transition temperature of 40° to 70° C., prepared from (i) and acid component containing at least 80 mole % of an aromatic dicarboxylic acid with (ii) a polyol component which comprises
  (a) at least 50 mole % of neopentyl glycol, and
  (b) 1 to 10% by weight of a diol selected from the group consisting of a linear chain $C_8$–$C_{16}$ alkylene diol, 2-methyl-1,8-octane diol and a mixture thereof, and
(II) 5 to 30% by weight of a curing agent.

10 Claims, No Drawings

POWDER COATING COMPOSITION

This application is a continuation of now abandoned application, Ser. No. 07/748,556, filed Aug 22, 1991 now abandoned.

FIELD OF THE INVENTION

The present invention relates to a powder coating composition which has excellent storage stability (e.g. blocking resistance) and provides a cured film having good weather resistance and a good balance of hardness and processability.

BACKGROUND OF THE INVENTION

Precoated steel plates, i.e. steel plates which are coated with paint before conducting a processing step (e.g. folding process), are widely used in the field of household appliances, automobiles and the like. The steel plates have advantages in atmosphere pollution, resource saving and labor saving, since a paint coating process after the processing is not necessary.

Contrary to the advantages, the paint to be precoated is required to have severe physical properties, especially two physical properties which are in conflict with each other (i.e. hardness and processability (e.g. folding ability)), in addition to normally required physical properties, such as adhesive properties, weather resistance, gloss and the like.

In order to comply with the required physical properties, especially hardness and processability, Japanese Kokoku Publication 62-21830 and Japanese Kokai Publication 59-8770 propose a polyester resin into which soft segments are introduced by using a monomer which is soft, such as 1,5-pentane diol, 1,6-hexane diol, sebacic acid and the like. Also, Japanese Kokai Publication 2-8242 proposes a polyester resin of which 10 to 80 mole % of a polyol component is 1,9-nonane diol, thus resulting in improvements in both hardness and processability.

However, the polyester resins proposed in the above mentioned publications adversely affect other properties when formulated into powder paint. For example, it is difficult to grind the polyester resins and they are not good for powder paint. When they are formulated into powder paint, it gives rise to the problems of poor storage stability, e.g. poor blocking resistance.

SUMMARY OF THE INVENTION

The present invention provides a powder coating composition which is suitable for the precoated steel plates. The powder coating composition of the present invention has excellent storage stability (e.g. blocking resistance) and provides a cured film having good weather resistance and a good balance of hardness and processability. Accordingly, the powder coating composition comprises:

(I) 95 to 70% by weight of a polyester resin having a glass transition temperature of 40° to 70° C., prepared from (i) an acid component containing at least 80 mole % of an aromatic dicarboxylic acid with (ii) a polyol component which comprises
   (a) at least 50 mole % of neopentyl glycol (i.e., 2,2-dimethyl-1,3-propanediol) and
   (b) 1 to 10% by weight of a diol selected from the group consisting of a linear chain $C_8$–$C_{16}$ alkylene diol, 2-methyl-1,8-octane diol and a mixture thereof, and (II) 5 to 30% by weight of a curing agent.

It is known to the art that processability and hardness are in conflict with each other and it is difficult to comply with both properties. In order to introduce hardness and weather resistance, rigid monomers (e.g. neopentyl glycol or cyclohexane dimethanol) are introduced into polyester chains, and transition temperature and an amount of a curing agent must be also controlled. The cured film, however, is too rigid and is ruptured during the folding process. In order to soften the film, soft segments are introduced into the polyester or plasticizers are introduced into the resin composition, and thus the film is soft and has high processability. The cured film, however, has decreased hardness or weather resistance.

For the powder paint, it is generally desired to have such storage stability or blocking resistance that the powder paint particles are not agglomerated or fused when stored at 30° to 40° C. Accordingly, a large amount of the soft segment cannot be introduced into the polyester resin because the storage stability is reduced.

In the present invention, a content of a rigid molecular structure of an aromatic ring is not reduced, and an alkyl-substituted aliphatic diol, which sterically controls the free revolution of the polyester chain, and a soft aliphatic diol is introduced into the polymer chain in a certain content to achieve the combination of the present invention.

The storage stability of the powder coating composition of the present invention is further enhanced by adding non-crosslinked resin particles in the composition.

DETAILED DESCRIPTION OF THE INVENTION

The polyester resin (I) of the present invention is prepared by copolymerizing the acid component (i) with the polyol component (ii).

The acid component (i) should contain at least 80 mole % of an aromatic dicarboxylic acid. The larger the amount of the aromatic dicarboxylic acid the better the hardness, weather resistance and water resistance of the cured film. Examples of the aromatic dicarboxylic acids are terephthalic acid, isophthalic acid, orthphthalic acid, phthalic anhydride, naphthalene dicarboxylic acid, 4,4'-diphenyl carboxylic acid and the like. Preferred are terephthalic acid and isophthalic acid, in view of weather resistance. The acid component (i) may contain other acids, such as an aliphatic acid (e.g. adipic acid, sebacic acid or succinic acid), an aromatic tricarboxylic acid (e.g. trimellitic acid) and the like. The other acids should be controlled to less than 20 mole %.

The polyol component (ii) is composed of neopentyl glycol (a) and a diol (b). The diol (b) is selected from the group consisting of a linear chain $C_8$–$C_{16}$ alkylene diol, 2-methyl-1,8-octane diol and a mixture thereof. The linear chain $C_8$–$C_{16}$ alkylene diol is generally represented by the following formula:

$$HO-(CH_2)_n-OH \quad \quad (X)$$

[wherein n is an integer of 8 to 16.].

Typical examples of the diols (X) are 1,8-octane diol, 1,9-nonane diol, 1,12-dodecane diol, 1,14-tetradecane diol, 1,16-hexadecane diol, and the like. Preferred is 1,9-nonane diol.

In the polyol component (ii), neopentyl glycol (a) is present in an amount of at least 50 mole % and the diol (b) is present in an amount of 1 to 10% by weight based on the polyester resin weight. If the neopentyl glycol is less than 50 mole %, the water or weather resistance of the cured film is deteriorated. If the diol (b) is less than 1% by weight, the processability is poor. If it is more than 10% by weight, the obtained polyester has a glass transition temperature of less than 40° C. and it is difficult to grind when formulated into a powder paint. The resulting powder paint has poor storage stability and low film hardness.

The polyol component (ii) may contain other polyols. Examples of the other polyols are ethylene glycol, propylene glycol, butane diol, trimethylene glycol, neopentylglycol hydroxypivalate, cyclohexane dimethanol, 2,2,4-trimethylpentane diol, 2-ethyl-2-butyl-1,3-propane diol and the like. Preferred are neopentylglycol hydroxypivalate and 1,4-cyclohexane dimethanol. In addition to the divalent polyols, polyols having 3 or more hydroxyl groups, such as trimethylolethane, trimethylolpropane, pentaerythritol and the like may be added thereto.

The polyester resin (I) of the present invention can be prepared from the acid component (i) and the polyol component (ii) by art-known methods, such as an ester-exchange method, a direct esterification followed by a melt-condensation. The polymerization can be conducted in the presence of a catalyst. Examples of the catalysts are dibutyltin oxide, antimony trioxide, zinc acetate, manganese acetate, cobalt acetate, calcium acetate, lead acetate, tetrabutyl titanate, tetraisopropyl titanate and the like. In the polymerization, whole amounts of the acid component (i) and the polyol component (ii) may be added simultaneously or they are divided into several portions which are mixed more than two times. The acid and polyol components may be stoichiometrically mixed for polymerization. For example, if a hydroxyl group-containing polyester is obtained, the polyol component is admixed in an amount of 1.0 to 1.3 mole based on one mole of the acid component. The catalyst may be present in an amount of 0.01 to 0.5% by weight based on the total amounts of the polyester. Polymerization conditions are known to the art, but generally conducted at a temperature of 200° to 250 ° C. for 4 to 10 hours.

The polyester resin of the present invention has a glass transition temperature (Tg) of 40° to 70° C. The polyester resin preferably has an acid value of 10 to 100 or a hydroxyl value of 10 to 100. It is also preferred that the resin has a number average molecular weight of 2,000 to 10,000. If an acid value or hydroxyl value is less than 10, cure is insufficient. If it is more than 100, a curing density is so high that processability is significantly reduced. If Tg is less than 40° C., the resulting powder paint has poor storage stability (poor blocking resistance). If it is more than 70° C., film appearance or film smoothness is poor. Molecular weights of less than 2,000 deteriorate processability and those of more than 10,000 lower film appearance or film smoothness.

The curing agent (II) of the present invention includes an epoxy compound having at least two epoxy groups or an isocyanate compound having at least two isocyanate groups which are blocked. Typical examples of the epoxy compound having at least two epoxy groups are diglycidyl ether of bisphenol A, diglycidyl ether of hydrogenated bisphenol A, diglycidyl orthophthalate, diglycidyl isophthalate, diglycidyl terephthalate, glycidyl p-oxybenzoate, diglycidyl tetrahydrophthalate, diglycidyl hexahydrophthalate, diglycidyl succinate, diglycidyl adipate, diglycidyl sebacate, ethyleneglycol diglycidyl ether, propyleneglycol diglycidyl ether, 1,4-butanediol diglycidyl ether, 1,6-hexanediol diglycidyl ether, triglycidyl trimellitate, triglycidyl isocyanurate, hydroquinone diglycidyl ether, an oligomer thereof, another epoxy compound modified with a polyester or so, and the like. The isocyanate compound to be blocked includes an aromatic diisocyanate compound, an aliphatic diisocyanate compound, an alicyclic diisocyanate and a polyisocyanate, which can be either low molecular weight or high molecular weight. Typical examples of the isocyanate compounds are tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, trimer of isophorone diisocyanate and the like. The isocyanate compound can be an isocyanate terminated compound which is prepared by reacting an excess amount of the above listed isocyanate with a low molecular weight active hydrogen-containing compound (e.g. ethylene glycol, propylene glycol, trimethylolpropane, glycerol, sorbitol, ethylenediamine, monoethanolamine, diethanol amine and triethanol amine) or a high molecular weight active hydrogen-containing compound (e.g. a polyether polyol, a polyester polyol and a polyamide). The isocyanate groups are blocked with a blocking agent. Examples of the blocking agents are phenols, such as phenol, thiophenol, methylthiophenol, ethylphenol, cresol, xylenol, resorcinol, nitrophenol, chlorophenol and the like; oximes, such as acetoxime, methyl ethyl ketoxime, cyclohexanone oxime and the like; alcohols, such as methanol, ethanol, propanol, butanol, t-butanol, t-pentanol, t-butanethiol and the like; halogenated alcohols, such as ethylene chlorohydrine, 1,3-dichloro-2-propanol and the like; lactams, such as epsilon-caprolactam, delta-valerolactam, gamma-butylolactam, beta-propyllactam and the like; aromatic amines; imides; activated methylene compounds; mercaptanes; imines; ureas; diaryl compounds; and the like.

The coating composition of the present invention may contain a curing catalyst which is known to the art. Typical examples of the catalysts are tin compounds, such as dibutyltin dilaurate; and tertiary amines, such as benzyldimethylamine.

In the preferred embodiment of the present invention, the powder coating composition may contain non-crosslinkable resin particles. The non-crosslinkable resin particles attach on the powder particles and prevent blocking between the powder particles. The resin particles also enhance flowability of the powder coating composition. The non-crosslinkable resin particles may be formed from any kind of polymers which are used in the field of paint. Preferred resins are epoxy resin, polyester resin, melamine resin and the like, in view of producibility or practicability. More preferred is vinyl resin, because physical properties of the resin can be easily controlled. It is also preferred that the non-crosslinkable resin particles have a glass transition temperature (Tg) of 50° to 150° C., preferably 70° to 120° C. If the temperature is less than 50° C., blocking resistance is poor when stored or transported. If it is more than 150° C., it is not practically used. The resin particles preferably have an average particle size of 0.001 to 10 micron, preferably 0.01 to 1.0 micron. It is difficult to produce small resin particles of less than 0.001 micron. If an average particle size is more than 10 micron, a large amount of the particles is formulated into the coating composition in order to obtain sufficient blocking resistance, thus resulting in poor film appearance. The resin particles can be prepared by art-known methods, such as emulsion polymerization, suspension polymerization, a grinding method of solution polymerized or bulk polymerized resin and the like. In the resin particles, an additive, such as ultraviolet absorber, antioxidant or surface controlling agent is added.

The powder coating composition of the present invention contains 70 to 95% by weight of the polyester resin (I) and 5 to 30% by weight of the curing agent (II); the total amount of the components (I) and (II) being 100% by weight. If the curing agent (II) is less than 5% by weight, the hardness, weather resistance or stain resistance of the cured film is poor. If it is more than 30% by weight, the resulting article has poor processability. The curing catalyst (III) may be contained in the composition in an amount of 0.1 to 5.0 parts by weight based on 100 parts by weight of the polyester resin. The non-crosslinkable resin particles (IV) may be present in the composition in an amount of 0.1 to 10% by weight, the % by weight being based on the three components (I), (II) and (III). If the particles are less than 0.1% by weight, the powder coating has poor storage stability. If it is more than 10% by weight, surface appearance is poor.

The powder coating composition can be a clear coating composition without a pigment or can contain a pigment. The pigment is not limited, but includes iron oxide, lead oxide, strontium chromate, carbon black, coal dust, titanium dioxide, phthalocyanine blue, talc, barium sulfate, cadmium yellow, cadmium red, chromium yellow, a metallic pigment (aluminum flake) and the like. An amount of the pigment is not limited, but preferably is within the range of 10 to 100 parts by weight based on 100 parts by weight of the polyester resin (I).

The powder coating composition of the present invention may be prepared by dissolving or dispersing the above mentioned component excepting the resin particles (IV) in a suitable solvent, followed by atomizing and drying it. It may also be prepared by melting and mixing the components excepting the resin particles (IV) and cooling, followed by grinding it. A particle size of the powder is not limited, but preferably is within the range of 5 to 30 micron. If necessary, the powder may be classified.

The obtained powder is mixed with the resin particles (IV) using a mixer, a hybridizer or a ball mill, if necessary. The resin particles (IV) may be coated on the powder, if necessary.

The powder coating composition is coated on a substrate by an art-known method. For example, the powder coating composition may be attached on the heated substrate and fused to form a uniform continuous film on it (spray coating or flow dipping coating). The composition may also be heated upon coating to coat it in a molten condition (flame spraying or plasma spraying). An electric charge may be given to the powder composition which is attached on the substrate by electrostatic powder, and then baked and dried (electrostatic coating).

The substrate to be coated can be anyone which is known to the art, including metal, glass, or primered substrates. Preferred is metal, such as steel or aluminum.

The film thickness can be varied by desired applications, but generally is 20 to 100 microns.

Curing is conducted at a temperature of 160° to 250° C. to obtain a high crosslinking degree. A curing period of time is generally varied by the curing temperature, but generally is 1 to 5 minutes at 200° to 250° C. or 15 to 30 minutes at 160° to 200° C.

Since the powder coating composition of the present invention does not contain an organic solvent, it is non-toxic. The powder coating composition does not give rise to agglomeration or fusing between powder particles when stored, and has good blocking resistance and storage stability.

Since the polyol component (ii) has a longer alkylene chain in comparison with conventional diols and has an alkyl group at a beta-position of a hydroxyl group, hydrophobic properties are high and the ester bond is protected by the sterical effect of the beta-position alkyl group. Thus, the possibility of hydrolysis of the ester bond is lowered and water resistance and weather resistance are significantly improved. The polyester resin (I) of the present invention is composed of an aromatic portion which is a rigid structure and a diol portion which is a relatively soft structure. Accordingly, the cured film has both good hardness and such good processability that even when the coated substrate is folded the cured film exhibits no cracks and no defects. The cured film also has good adhesive properties, and glossy appearance. The coating composition, thus, is very good for precoated steel panels.

EXAMPLES

The present invention is illustrated by the following Examples which, however, are not to be construed as limiting to their details. In Examples, the "parts" are based on weight, unless otherwise indicated.

Preparation of polyester resin

Preparation 1

A reaction vessel, equipped with a heater, a stirrer, a nitrogen gas introducing tube and a fractional distillation column, was charged with 34.30 parts (50 mole %) of dimethyl terephthalate (DMTP), 35.10 parts (89 mole %) of neopentyl glycol (NPG), 4.47 parts (8 mole %) of 1,9-nonane diol, 1.39 parts (3 mole %) of trimethylolpropane (TMP) and 0.05 parts of dibutyltin oxide, and heated in a nitrogen atmosphere to melt. The content was ester-exchanged at a temperature of 130° to 210° C. during which methanol was distilled off. Then, the ester-exchange continued at 210° C. and 10.6 g of methanol was distilled off. After cooling it, 29.38 parts (50 mole %) of terephthalic acid was added thereto and then ester-exchanged at 240° C. The reaction was terminated at the point that the obtained resin had an acid value of 2.0. The resulting polyester resin A had a hyroxyl value of 35 and a number average molecular weight calculated in terms of polystyrene of 4,500. The resin also had a glass transition temperature of 56° C., measured by a differential scanning calorimeter (DSC).

Preparations 2 to 6 and Comparative Preparation 1 to 3

Polyester resins B-I were prepared as generally described in Preparation 1, from the components in Table 1. The hydroxyl values, molecular weight and Tg of the resulting polyester resins B-I are also shown in Table 1.

TABLE 1

| Polyester | Preparation No. 1 A | 2 B | 3 C | 4 D | 5 E | 6 F | Comparative Preparation No. 1 G | 2 H | 3 I |
|---|---|---|---|---|---|---|---|---|---|
| DMTP | 34.30(50) | 34.52(50) | 33.02(50) | 30.09(50) | 34.40(50) | — | 32.30(50) | 36.69(50) | 32.70(50) |
| Terephthalic acid | 29.38(50) | 29.58(50) | 28.29(50) | 25.78(50) | 29.47(50) | 58.17(100) | 27.67(50) | 31.43(50) | 11.21(20) |
| Adipic acid | — | — | — | — | — | — | — | — | 14.79(30) |
| TMP | 1.39(3) | 1.39(3) | 1.40(3) | 5.00(9) | 0.04(0.1) | 1.80(3) | 1.40(3) | 1.38(3) | 1.31(3) |
| NPG | 35.10(89) | 36.48(92) | 25.75(67) | 29.49(70) | 35.82(92) | 31.96(83) | 30.36(79) | 12.21(29) | 35.13(89) |
| Ethylene glycol | — | — | — | — | — | — | — | 9.69(39) | — |
| 1,6-hexane diol | — | — | — | — | — | — | — | 13.85(29) | — |
| 1,9-nonane diol | 4.74(8) | 2.98(5) | 8.57(15) | — | — | 8.08(14) | 10.55(18) | — | 4.95(8) |
| C9 diol*1 | — | — | — | — | — | — | — | — | — |
| 1,4-cyclohexane diol | — | — | 7.70(15) | 8.02(14) | — | — | — | — | — |
| 1,12-dodecane diol | — | — | — | 5.94(7) | — | — | — | — | — |
| 1,10-decane diol | — | — | — | — | 5.20(8) | — | — | — | — |
| Content (%) of polyol (b) in polyester resin | 5.4 | 3.4 | 9.7 | 6.8 | 6.0 | 9.2 | 12.1 | 0.0 | 5.7 |
| Number average molecular weight | 4,500 | 4,300 | 4,850 | 3,200 | 7,800 | 4,500 | 4,300 | 4,650 | 4,600 |
| Tg (°C.) | 56 | 60 | 48 | 53 | 53 | 43 | 38 | 43 | 27 |
| Hydroxyl value | 35 | 38 | 33 | 68 | 25 | 36 | 36 | 36 | 35 |
| Acid value | 2 | 1 | 1 | 2 | 1 | 1 | 2 | 2 | 2 |

In Table, number in ( ) shows mole % in respective acid or polyol components.
*1 A mixture of 1,9-nonane diol/2-methyl-1,8-octane diol = 65/35, available from Kuraray Co., Ltd.

Preparation 7

A reaction vessel, equipped with a heater, a stirrer, a nitrogen gas introducing tube and a fractional distillation column, was charged with 35.09 parts (45.3 mole %) of dimethyl terephthalate (DMTP), 36.88 parts (95 mole %) of neopentyl glycol (NPG), 3.02 parts (5.0 mole %) of 1,9-nonane diol and 0.05 parts of dibutyltin oxide, and heated in a nitrogen atmosphere to melt. The content was ester-exchanged at a temperature of 130° to 210° C. during which methanol was distilled off. Then, the ester-exchange continued at 210° C. and 11.6 g of methanol was distilled off. After cooling it, 30.05 parts (45.3 mole %) of terephthalic acid was added thereto and then ester-exchanged at 240° C. The reaction was terminated at the point that the obtained resin had an acid value of 10.0. Then, 3.57 parts (4.7 mole %) of trimellic anhydride and 2.76 parts (4.7 mole %) of phthalic anhydride were added thereto and esterified at 210° C. The reaction was terminated at an acid value of 39.0. The resulting polyester resin L had a hyroxyl value of 0.5 and a number average molecular weight calculated in terms of polystyrene of 5,300. The resin also had a glass transition temperature of 59° C., measured by a differential scanning calorimeter (DSC).

Preparations 8 to 10 and Comparative Preparation 4 to 6

Polyester resins M-R were prepared as generally described in Preparation 7, from the components in Table 2. The hydroxyl values, molecular weight and Tg of the resulting polyester resins M-R are also shown in Table 2.

TABLE 2

| Polyester | Preparation No. 7 L | 8 M | 9 N | 10 O | Comparative Preparation No. 4 P | 5 Q | 6 R |
|---|---|---|---|---|---|---|---|
| DMTP | 35.09(45.3) | 34.59(42.5) | 33.47(46.4) | 35.09(45.3) | 28.54(34.2) | 37.31(45.6) | 35.26(45.5) |
| Terephthalic acid | 30.05(45.3) | 29.63(42.5) | 28.68(46.4) | 30.05(45.3) | 24.45(34.2) | 31.97(45.6) | 30.11(45.5) |
| Adipic acid | — | — | — | — | 14.34(23.0) | — | — |
| NPG | 36.88(95.0) | 28.42(71) | 25.45(70) | 36.88(95.0) | 34.00(70) | 12.32(30) | 32.63(79) |
| Ethylene glycol | — | 3.50(15) | — | — | 7.47(30) | 9.77(40) | — |
| 1,6-hexane diol | — | — | — | — | — | 13.97(30) | — |
| 1,9-nonane diol | 3.02(5.0) | — | — | — | — | — | 13.50(21) |
| C9 diol*1 | — | — | — | 3.02(5.0) | — | — | — |
| 1,4-cyclohexane diol | — | — | 10.15(20) | — | — | — | — |
| 1,12-dodecane diol | — | — | 7.05(10) | — | — | — | — |
| 1,10-decane diol | — | 9.21(14) | — | — | — | — | — |
| Trimellitic anhydride | 3.57(4.7) | 6.07(7.5) | 2.30(3.2) | 3.57(4.7) | 3.57(4.3) | 3.57(4.4) | 3.57(4.5) |
| Phthalic anhydride | 2.76(4.7) | 4.69(7.5) | 2.21(4.0) | 2.76(4.7) | 2.76(4.3) | 2.76(4.4) | 2.76(4.5) |
| Content (%) of polyol (b) in polyester resin | 3.2 | 9.0 | 7.7 | 3.2 | 0.0 | 0.0 | 14.4 |
| Number average molecular weight | 5,300 | 2,800 | 8,200 | 4,900 | 5,600 | 5,400 | 5,800 |
| Tg (°C.) | 59 | 46 | 63 | 57 | 40 | 46 | 36 |
| Hydroxyl value | 0.5 | 1 | 0 | 1 | 1 | 1 | 1 |
| Acid value | 39 | 61 | 25 | 38 | 36 | 38 | 37 |

In Table, number in ( ) shows mole % in respective acid or polyol components.
*1 A mixture of 1,9-nonane diol/2-methyl-1,8-octane diol = 65/35, available from Kuraray Co., Ltd.

Preparation of non-crosslinkable resin particles

Production 1

A reaction vessel equipped with a stirrer and a condenser was charged with 380 parts of deionized water and 2 parts of a nonionic surfactant (available from Sanyo Chemical Industries Ltd. as MON 2), and dissolved at 80° C. with stirring. To the content, one part of ammonium persulfate and 10 parts of deionized water were added, to which a mixture solution of 10 parts of 2-hydroxyethyl methacrylate, 70 parts of styrene and 20 parts of n-butyl methacrylate was added dropwise for 60 minutes. After finishing the drop, mixing continued at 80° C. for 60 minutes to obtain an emulsion having a nonvolatile content of 20% and a particle size of 0.03 to 0.05 micron. The emulsion was spray dried to obtain non-crosslinkable resin particles having Tg of 65° C. and an average particle size of 0.03 to 0.05 micron.

Production 2

A reaction vessel equipped with a stirrer and a condenser was charged with 380 parts of deionized water and 2 parts of a nonionic surfactant (available from Sanyo Chemical Industries Ltd. as MON 2), and dissolved at 80° C. with stirring. To the content, one part of ammonium persulfate and 10 parts of deionized water were added, to which a mixture solution of 85 parts of methyl methacrylate, 5 parts of styrene and 10 parts of n-butyl methacrylate was added dropwise for 60 minutes. After finishing the drop, mixing continued at 80° C. for 60 minutes to obtain an emulsion having a nonvolatile content of 20% and a particle size of 0.03 to 0.05 micron. The emulsion was spray dried to obtain non-crosslinkable resin particles having Tg of 90° C. and an average particle size of 0.03 to 0.05 micron.

Preparation of powder paint

Example 1

The following ingredients including Polyester A were dry-blended by a Henchell Mixer for about 30 seconds, and then extruded at 100° C. using an extruder (available from Buss Company as Bussco Kneader). The extruded mixture was ground and sieved with a metal net of 150 mesh to obtain a powder paint.

| Ingredients | Parts |
| --- | --- |
| Polyester resin A | 80 |
| Crelan UI[1] | 20 |
| Titanium oxide | 40 |
| Dibutyltin dilaurate | 1 |
| Modaflow[2] | 1 |

[1] Epsilon-caprolactam block of isophorone diisocyanate available from Bayer AG, having an NCO equivalent of 365.
[2] Surface controlling agent available from Monsant Company The resulting powder paint was electrostatically coated on a steel panel of 0.6 mm thickness which had been treated with zinc phosphate, and baked at 230° C. for 5 minutes to obtain a cured film. The powder paint was evaluated with storage stability (blocking resistance) and the coated panel was evaluated with film properties. The results of the evaluations are shown in Table 3.

Examples 2–6 and Comparative Example 1–3

The same treatment as Example 1 was conducted using Polyester resin B–I and the results are shown in Table 3. In Examples 4 and 5, a weight ratio of polyester resin /Crelan UI was changed to respectively 65/35 and 85/15.

Examples 7 and 8

One part of the non-crosslinkable resin particles of Production 1 or 2 was added to 100 parts of the powder paint obtained in Example 6 and mixed for 30 seconds using a Henchell Mixer to obtain powder paints. The same test was conducted and the results are shown in Table 3.

TABLE 3

| | Example No. | | | | | | | | Comparative Examples No. | | |
| --- | --- | --- | --- | --- | --- | --- | --- | --- | --- | --- | --- |
| | 1 | 2 | 3 | 4 | 5 | 6 | 7 | 8 | 1 | 2 | 3 |
| Polyester | A | B | C | D | E | F | F | F | G | H | I |
| Pencil hardness | F-H | H | F | F | F-H | HB-F | F-H | H | 2B-B | B | 2B |
| Impact resistance*1 | 50 | 45 | 50 | 50 | 50 | 50 | 50 | 45 | 50 | 50 | 45 |
| Erichsen test*2 | Good | Good | Good | Good | Good | Good | Good | Good | Good | Good | Good |
| Flex test*3 | | | | | | | | | | | |
| 4T | Good | Good | Good | Good | Good | Good | Good | Good | Good | Good | Good |
| 2T | Good | Good | Good | Good | Good | Good | Good | Good | Good | Poor | Poor |
| 0T | Good | Poor | Good | Good | Good | Good | Good | Poor | Good | Poor | Poor |
| Boiled water resistance*4 | 98 | 99 | 91 | 95 | 93 | 92 | 97 | 96 | 46 | 75 | 45 |
| Corrosion resistance*5 | 1.0 | 1.0 | 2.0 | 1.0 | 1.0 | 1.5 | 1.0 | 1.0 | 5.0 | 3.5 | 6.0 |
| Weather resistance*6 | | | | | | | | | | | |
| 300 H | 100 | 100 | 97 | 97 | 96 | 99 | 99 | 96 | 71 | 83 | 78 |
| 500 H | 95 | 96 | 88 | 92 | 93 | 91 | 95 | 88 | 48 | 55 | 46 |
| Storage stability*7 | Good | Good | Fairly good | Good | Good | Fairly bad | Good | Good | Bad | Bad | Bad |

*1 Test was conducted according to JIS-K-5400. Evaluation was made by a height (cm) at which no cracks and no peels occurred.
*2 Test was conducted according to JIS-B-7777. Good shows a level at which no cracks and no peels occur at an indentation distance of 7 mm.
*3 A coated panel was folded 180° and cracks at the folded portion were observed. 4T and 2T respectively show that 4 and 2 panels having the same thickness were inserted in the folded portion. 0T shows that no panel was inserted and the coated panel was directly folded.
*4 A coated panel was dipped in boiled water for 2 hours. A gloss retention (%) was determined between before and after dipping.
*5 Salt spraying was conducted according to JIS-K-5400 7.8 and a peeling width was determined when an adhesive tape peeling on a cross cut portion was conducted.
*6 A coated panel was put in a Sunshine Weather-O-meter and a gloss retention (%) was determined after 300 hours or 500 hours.
*7 After a powder paint was stored at 40° C. for one month, a flowability of it was evaluated. Good shows no change on flowability. Fairly good shows that some agglomerates are present but are easily broken by shaking and flowability recovers. Bad shows that agglomerates are not broken and indicate poor flowability.

Example 9

The following ingredients including Polyester L were dry-blended by a Henschell Mixer for about 30 seconds, and then extruded at 100° C. using an extruder (available from Buss Company as Bussco Kneader). The extruded mixture was ground and sieved with a metal net of 150 mesh to obtain a powder paint.

| Ingredients | Parts |
| --- | --- |
| Polyester resin L | 87 |
| Triglycidyl isocyanurate | 13 |
| Titanium oxide | 40 |
| Modaflow[2] | 1 |

The resulting powder paint was electrostatically coated on a steel panel of 0.6 mm thickness which had been treated with zinc phosphate, and baked at 230° C. for 5 minutes to obtain a cured film. The powder paint was evaluated with storage stability (blocking resistance) and the coated panel was evaluated with film properties. The results of the evaluations are shown in Table 4.

Examples 2–6 and Comparative Example 1–3

The same treatment as Example 9 was conducted using Polyester resin M-R and the results are shown in Table 3. In Examples 10 and 11 a weight ratio of polyester resin/Triglycidyl isocyanuvate (TGIC) was changed to respectively 80/20 and 90/10.

Example 13

One part of the non-crosslinkable resin particles of Production 1 was added to 100 parts of the powder paint obtained in Example 10 and mixed for 30 seconds using a Henschell Mixer to obtain powder paints. The same test was conducted and the results are shown in Table 4.

TABLE 4

| | Example No. | | | | | Comparative Examples No. | | |
| --- | --- | --- | --- | --- | --- | --- | --- | --- |
| | 9 | 10 | 11 | 12 | 13 | 4 | 5 | 6 |
| Polyester | L | M | N | O | M | P | Q | R |
| Pencil hardness | F-H | HB | F | F-H | H | 2B-B | F | 2B-B |
| Impact resistance*[1] | 50 | 50 | 50 | 50 | 45 | 50 | 45 | 50 |
| Erichsen test*[2] | Good | Good | Good | Good | Good | Good | Good | Good |
| Flex test*[3] | | | | | | | | |
| 4T | Good | Good | Good | Good | Good | Good | Good | Good |
| 2T | Good | Good | Good | Good | Good | Good | Good | Good |
| 0T | Good | Good | Good | Good | Fairly good | Poor | Poor | Good |
| Boiled water resistance*[4] | 98 | 93 | 92 | 96 | 97 | 47 | 65 | 77 |
| Corrosion resistance*[5] | 1.0 | 1.5 | 0.5 | 2.0 | 1.0 | 3.5 | 5.0 | 3.5 |
| Weather resistance*[6] | | | | | | | | |
| 300 H | 98 | 100 | 98 | 99 | 98 | 78 | 76 | 88 |
| 500 H | 95 | 88 | 86 | 94 | 96 | 55 | 48 | 63 |
| Storage stability*[7] | Good | Fairly good | Good | Good | Good | Bad | Bad | Bad |

As is apparent from the above results, in the combination of the polyester resin and a curing agent of a blocked isocyanate compound (Examples 1–6) or in the combination of the polyester resin and a curing agent of an epoxy compound, there is a good balance of hardness and processability (impact resistance, erichsen and flex test), and durability (boiled water resistance, corrosion resistance and weather resistance) is also good. When combined with non-crosslinkable resin particles (Examples 7, 8 and 13), storage stability is further improved.

What is claimed is:

1. A powder coating composition comprising:
   (I) 95 to 70% by weight of a polyester resin having a glass transition temperature of 60° to 70° C., either an acid value of 10 to 100 or a hydroxyl value of 10 to 100, and a number average molecular weight of 2,000 to 10,000, prepared from (i) an acid component containing at least 80 mole % of an aromatic dicarboxylic acid with (ii) a polyol component which comprises
      (a) at least 50 mole % of neopentyl glycol,
      (b) 1 to 10% by weight of a diol selected from the group consisting of 1,9-nonane diol, 2-methyl-1,8-octane diol and a mixture thereof, and
      (c) 0.038% by weight or less of a trialcohol, and
   (II) 5 to 30% by weight of a curing agent selected from the group consisting of:
      an epoxy compound having at least two epoxy groups, selected from the group consisting of diglycidyl ether of bisphenol A, diglycidyl ether of hydrogenated bisphenol A, diglycidyl orthphthalate, diglycidyl isophthalate, diglycidyl terephthalate, glycidyl p-oxybenzoate, diglycidyl tetrahydrophthalate, diglycidyl hexahydrophthalate, diglycidyl succinalte, diglycidyl adipate, diglycidyl sebacate, ethyleneglycol diglycidyl ether, propyleneglycol diglycidly ether, 1,4-butanediol diglycidyl ether, 1,6-hexanediol diglycidyl ether, triglycidyl trimellitate, triglycidyl isocyanurate, hydroquinone diglycidyl ether, an oligomer thereof and another epoxy compound modified with a polyester, and
      an isocyanate compound having at least two isocyanate groups which are blocked.

2. The powder coating composition according to claim 1 wherein said aromatic dicarboxylic acid is terephthalic acid, isophthalic acid, othphthalic acid, phthalic anhydride, naphthalene dicarboxylic acid or 4,4'-diphenyl carboxylic acid.

3. The powder coating composition according to claim 1 wherein said acid component further contains adipic acid, sebacic acid, succinic acid or trimellitic acid.

4. The powder coating composition according to claim 1 wherein said polyol component (ii) further contains ethylene glycol, propylene glycol, butane diol, trimethylene glycol, neopentylglycol hydroxypivalate, cyclohexane dimethanol, 2,2,4-trimethylpentane diol, or 2-ethyl-2-butyl-1,3-propane diol.

5. The powder coating composition according to claim 1 wherein said isocyanate compound to be blocked is tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate or trimer of isophorone diisocyanate.

6. The powder coating composition according to claim 1 further comprising a curing catalyst (III).

7. The powder coating composition according to claim 6 wherein said catalyst is a tin compound or tertiary amine.

8. The powder coating composition according to claim 1 further comprising non-crosslinkable resin particles.

9. The powder coating composition according to claim 8 wherein said non-crosslinkable resin particles have a glass transition temperature (Tg) of 50° to 150° C. and an average particle size of 0.001 to 10 micron.

10. The powder coating composition according to claim 8 wherein said non-crosslinkable resin particles are present in the composition in an amount of 0.1 to 10% by weight, the % by weight being based on the three components (I), (II) and (III).

* * * * *